United States Patent
Ruan et al.

(10) Patent No.: US 10,171,375 B2
(45) Date of Patent: Jan. 1, 2019

(54) CONSTRUCTING COMPUTING SYSTEMS WITH FLEXIBLE CAPACITY OF RESOURCES USING DISAGGREGATED SYSTEMS

(71) Applicant: INTERNATIONAL BUSINESS MACHINES CORPORATION, Armonk, NY (US)

(72) Inventors: Yaoping Ruan, White Plains, NY (US); John A. Bivens, Ossining, NY (US); Koushik K. Das, Yorktown Heights, NY (US); Min Li, San Jose, CA (US); Ruchi Mahindru, Elmsford, NY (US); HariGovind V. Ramasamy, Ossining, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 15/134,689

(22) Filed: Apr. 21, 2016

(65) Prior Publication Data
US 2017/0310607 A1    Oct. 26, 2017

(51) Int. Cl.
*H04L 12/911* (2013.01)
*H04L 29/08* (2006.01)
*H04L 12/24* (2006.01)

(52) U.S. Cl.
CPC ........ *H04L 47/781* (2013.01); *H04L 41/0806* (2013.01); *H04L 41/5022* (2013.01); *H04L 41/5041* (2013.01); *H04L 67/1097* (2013.01)

(58) Field of Classification Search
CPC .................. H04L 47/781; H04L 41/5022; H04L 67/1097
See application file for complete search history.

(56) References Cited

U.S. PATENT DOCUMENTS

| 8,490,087 B2 | 7/2013 | Beaty et al. |
| 2013/0297655 A1* | 11/2013 | Narasayya ........ G06F 17/30575 707/791 |
| 2014/0052877 A1* | 2/2014 | Mao ...................... H04L 61/103 709/245 |

(Continued)

OTHER PUBLICATIONS

Anonymous, "Method and apparatus to determine Storage usage and Backend Mapping by applications on Software Defined Storage Systems," An IP.com Prior Art Database Technical Disclosure, IP.com No. 000240938 (12 pages).

(Continued)

*Primary Examiner* — Arvin Eskandarnia
(74) *Attorney, Agent, or Firm* — Griffiths & Seaton PLLC

(57) ABSTRACT

Various embodiments for allocating resources in a disaggregated cloud computing environment, by a processor device, are provided. Respective members of a pool of hardware resources are assigned to each one of a plurality of tenants based upon a classification of the respective members of the pool of hardware resources. The respective members of the pool of hardware resources are assigned to each one of the plurality of tenants independently of a hardware enclosure in which the respective members of the pool of hardware resources are physically located.

27 Claims, 6 Drawing Sheets

(56) References Cited

U.S. PATENT DOCUMENTS

2015/0186069 A1   7/2015   Sharma et al.

OTHER PUBLICATIONS

IBM, "Method and System for an Opportunistic Model for Cloud Work Load Processing," An IP.com Prior Prior Art Database Technical Disclosure, IP.com No. 000188291, Sep. 29, 2009 (3 pages).
Anonymous, "System and Method to Predict and Dynamically Adjust the Allocation of Resources for Cloud," An IP.com Prior Art Database Technical Disclosure, IP.com No. 000225612 (9 pages).

* cited by examiner

CONSTRUCTING COMPUTING SYSTEMS WITH FLEXIBLE CAPACITY OF RESOURCES USING DISAGGREGATED SYSTEMS

BACKGROUND OF THE INVENTION

Field of the Invention

The present invention relates generally to large scale computing, and more particularly to pooling and dynamically distributing hardware resources for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects.

SUMMARY OF THE INVENTION

Computing resources are usually pre-configured by vendors at fixed levels of configurations. One aspect is that each individual computing resource, such as memory size, number of CPUs, disk size, etc. has limited boundary. Another aspect is that each computing platform has a limited number of customization options. Therefore, today's workloads are running under these limitations. These limitations are a reason that techniques such as memory swapping and caching optimization are used.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

In view of the foregoing, various embodiments for allocating resources in a disaggregated cloud computing environment, by a processor device, are provided. Respective members of a pool of hardware resources are assigned to each one of a plurality of tenants based upon a classification of the respective members of the pool of hardware resources. The respective members of the pool of hardware resources are assigned to each one of the plurality of tenants independently of a hardware enclosure in which the respective members of the pool of hardware resources are physically located.

In some embodiments, the classifications of the pool of hardware resources include at least memory devices, processors, and storage devices.

In some embodiments, the assigning is performed to each respective one of the plurality of tenants according to tenant requirements, Service Level Agreement (SLA) requirements, and tenant workload characteristics.

In some embodiments, initial assignments of the classifications of the pool of hardware resources are constructed for each respective one of the plurality of tenants according to known tenant workload characteristics and an availability of individual hardware resources.

In some embodiments, assignments of the classifications of the pool of hardware resources to each respective one of the plurality of tenants are changed based upon changes to the tenant requirements, the SLA requirements, and the tenant workload characteristics.

In some embodiments, assignments of the classifications of the pool of hardware resources to each respective one of the plurality of tenants are changed based upon optimizing a workload cost and a workload performance.

In some embodiments, assignments of the classifications of the pool of hardware resources to each respective one of the plurality of tenants based upon a predicted change to the tenant requirements, the SLA requirements, and the tenant workload characteristics.

In some embodiments, a segmentation of each of the classifications of the pool of hardware resources between each respective one of the plurality of tenants is maintained.

In some embodiments, a migration process is initiated to optimize a locality of each individual hardware resource assigned to a respective one of the plurality of tenants.

In some embodiments, a mapping between each individual hardware resource and a respective one of the plurality of tenants to which the hardware resource is assigned is maintained, and each individual hardware resource is identified with a unique identifier.

In addition to the foregoing exemplary embodiments, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As aforementioned, computing resources are usually pre-configured by vendors at fixed levels of configurations. One aspect is that each individual computing resource, such as memory size, number of CPUs, disk size, etc. has limited boundary. Another aspect is that each computing platform has a limited number of customization options. Therefore, today's workloads are running under these limitations. These limitations are a reason that techniques such as memory swapping and caching optimization are used.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

Figure 1:
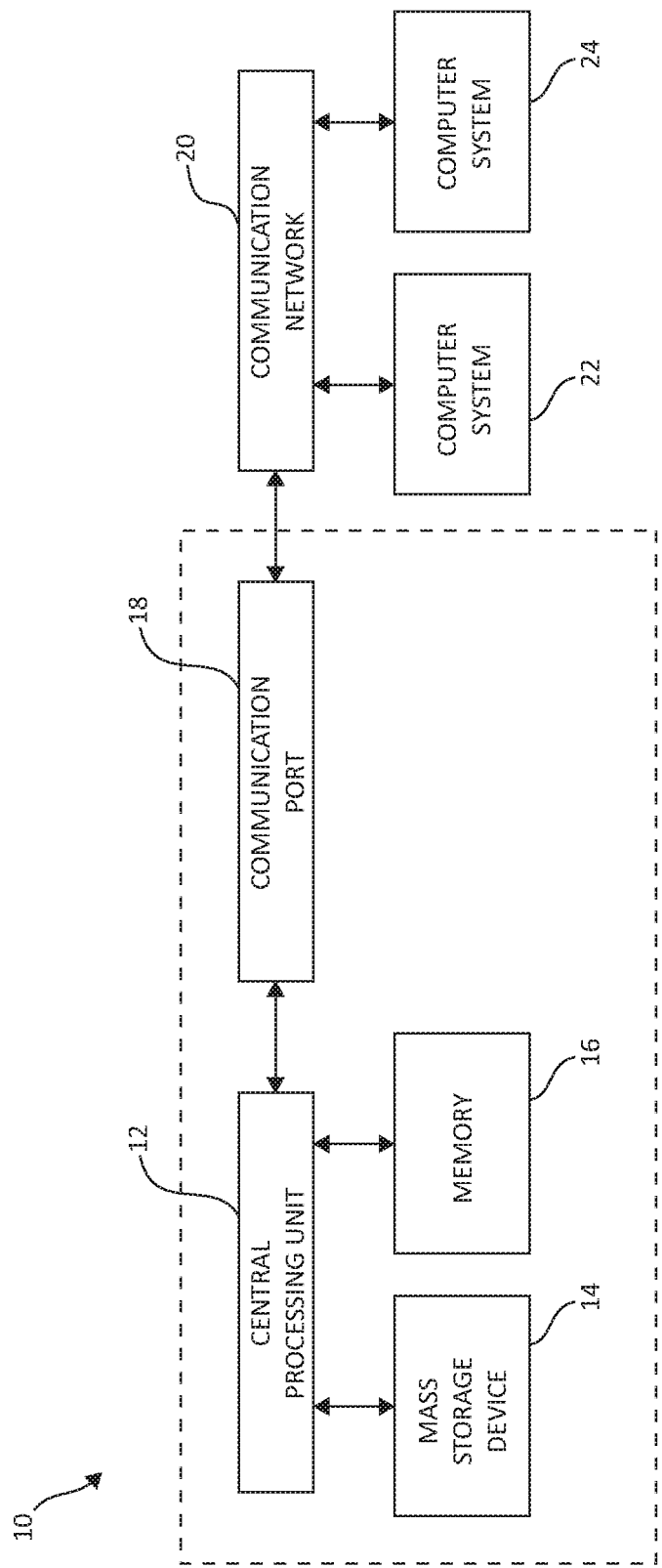
FIG. 1 is a block diagram showing a hardware structure illustrating a basic computing system to aid in demonstrating the concepts of the present invention.

An example of such a pre-configured computing system is referenced in FIG. 1. FIG. 1 illustrates an architecture 10 of a basic computing system environment. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. Memory device 16 and storage devices 14 are connected to CPU 12 via a signal-bearing medium. In addition, CPU 12 is connected through communication port 18 to a communication network 20, having an attached plurality of additional computer host systems 24. Further, memory device 16 and the CPU 12 may be embedded and included in each component of the computing system 10.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is the cloud software that provides the emulation to create the flexible on-demand functionality that cloud services are known for. This functionality is quite limited, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, a VM cannot change its base resources, such as adding memory or adding virtual CPUs. This is because such a VM shares the hardware resources of a fixed pre-built server enclosure with other VMs, and it may not be possible to displace other users to make room for the resource expansion of the first user. While such is possible in principle (e.g. by migrating other users (live VM migration) to other servers), such an operation would create an abundant increase in traffic and require an overload on the datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Programming Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

Accordingly, the mechanisms of the illustrated embodiments implement disaggregated computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual resource can be dynamically switched without shutting down any hardware nor running applications. Individual hardware resources from these pools can be selected to assemble computer systems on-demand. The present invention teaches a method of assembling a computer system with a flexible capacity of individual computing resources such that workloads are computed based on hardware resource configurations that are most suitable for the respective workload. In one embodiment, for example, a system may be constructed with an extremely high capability of memory size but with a more moderate capacity of CPU and other resources for a memory-intensive workload.

Figure 2:
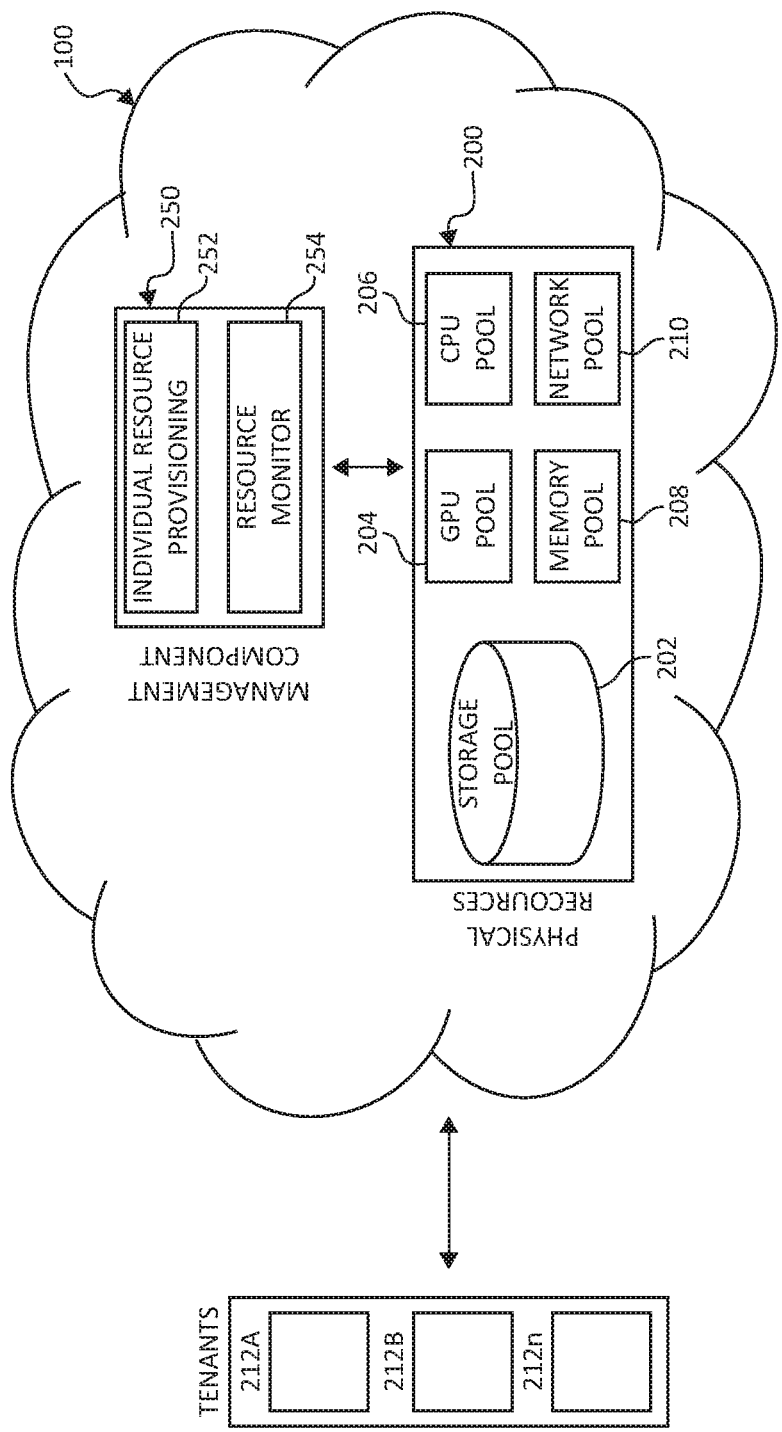
FIG. 2 is a block diagram showing a hardware structure of a disaggregated computing environment, in which aspects of the present invention may be realized.

Advancing to FIG. 2, a block diagram of a disaggregated computing environment is illustrated, including cloud environment 100. Within cloud environment 100 is the disaggregated computing system comprising physical hardware resources 200. Physical hardware resources 200 may comprise of classifications of the hardware resources such as storage device pool 202, a Graphics Processing Unit (GPU) device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254. In communication with the cloud environment 100 and management module 250 are tenants 212A, 212B, and 212n. Tenants 212A, 212B, and 212n may communicate with the cloud environment and the management module via networking means provided by any signal-bearing medium.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, while staying in spirit and scope of the present invention.

In one embodiment, the management module 250 interacts with individual tenants to receive workload requests and locate the best suitable hardware resources for the given workload. Individual hardware resources are tracked and a mapping is maintained between each respective tenant and assigned hardware resource. Each hardware resource is identified using a unique identifier. This identifier may be a physical identifier (e.g. barcode) and/or a virtual identifier (e.g. code based). The management module may use the individual resource provisioning component 252, the resource monitor 254, a combination thereof, or any other suitable modules or means known in the art to accomplish these mechanisms.

Figure 3A:
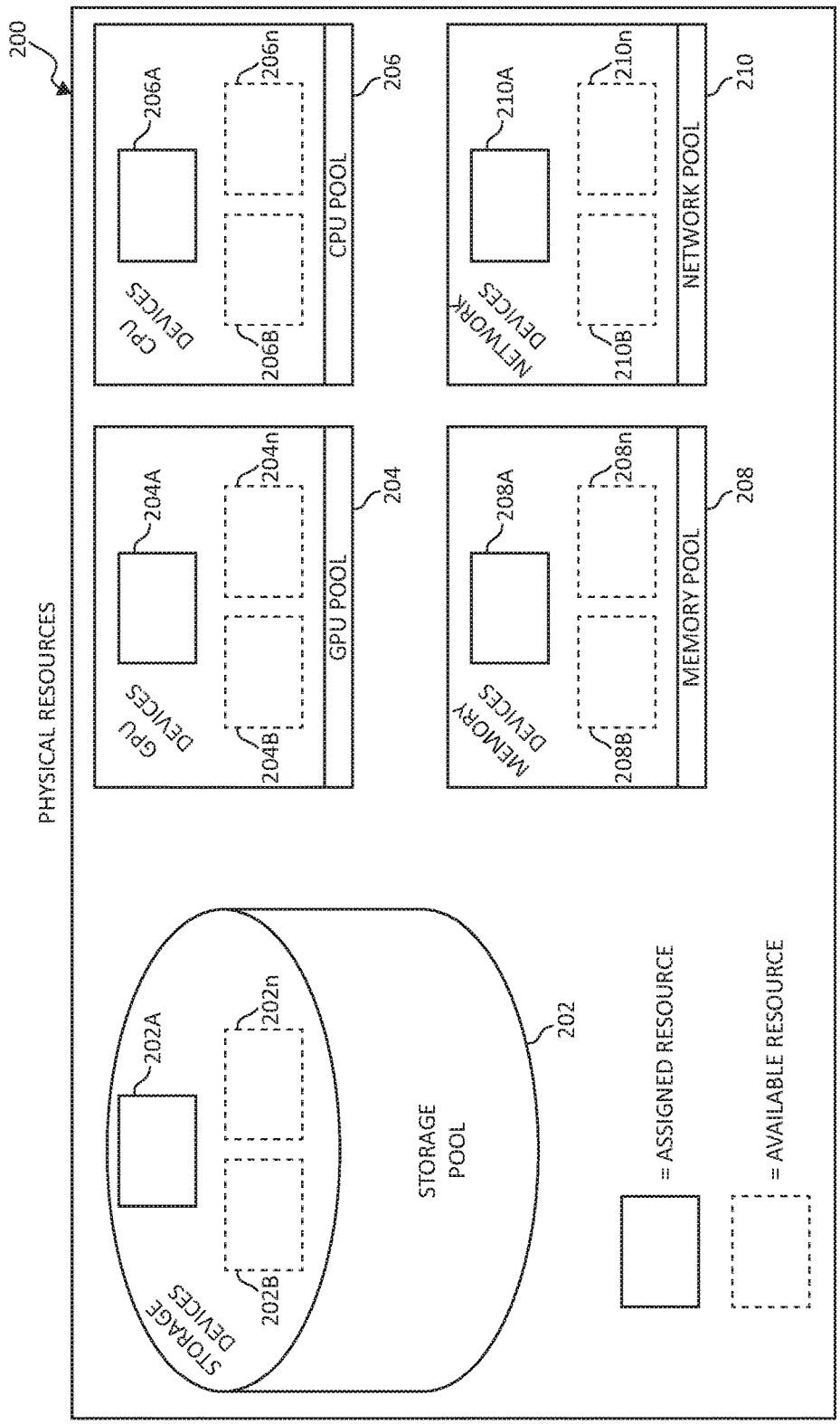
FIG. 3A is an additional block diagram showing a hardware structure of a disaggregated computing environment, in which aspects of the present invention may be realized.

FIG. 3A is a block diagram illustrating the physical hardware resources 200 portion of FIG. 2. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool includes memory devices 208A, 208B, and 208n. Finally, the network device pool includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) is assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant workload.

In one embodiment, in determining the most suitable capacity of each individual hardware resource of the hardware resources 200, an initial configuration is constructed based on known characteristics of the respective tenant 212A-n workload and availability of the hardware resources 200. The management module 250 continuously collects multiple metrics. These metrics may include workload information and individual hardware resource allocation monitoring. Individual hardware resources of the hardware resources 200 may be dynamically adjusted. In one example, an algorithm may be used to expand memory capacity if memory swap activity is occurring. In another example, additional storage space may be allocated if a tenant 212A-n file system is predicted to be approaching full. In still a further example additional processors may be allocated if currently all are fully utilized.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being added in two, four, etc. quantities.

In some embodiments, hardware resources are allocated to tenants 212A-n based upon tenant Service Level Agreements (SLAs) with a particular service provider. Hardware resources 200 may be dynamically changed when changes occur to the respective tenant 212A-n SLA. In other embodiments, hardware resources 200 may be allocated to respective tenants 212A-n based upon a workload cost and/or a workload performance. In still other embodiments, as mentioned above, hardware resources 200 may be allocated to respective tenants 212A-n based upon a predicted change to tenant 212A-n SLAs, workload requirements, workload performance and cost factors, etc.

All tenants share each a certain quantity of hardware resources 200 in each respective pool of the disaggregated system. A resource segmentation technique prevents allocating a large quantity of any single hardware resource classification. The management module 250 may initiate a migration process to optimize the locality of hardware resources 200 with respect to tenant 212A-n allocation, workload information, tenant SLAs, or other such factors. This migration process may be initiated by determining a certain predetermined threshold has been reached for an allocation of any single hardware resource to a respective tenant 212A-n, or other such means.

Figure 3B:
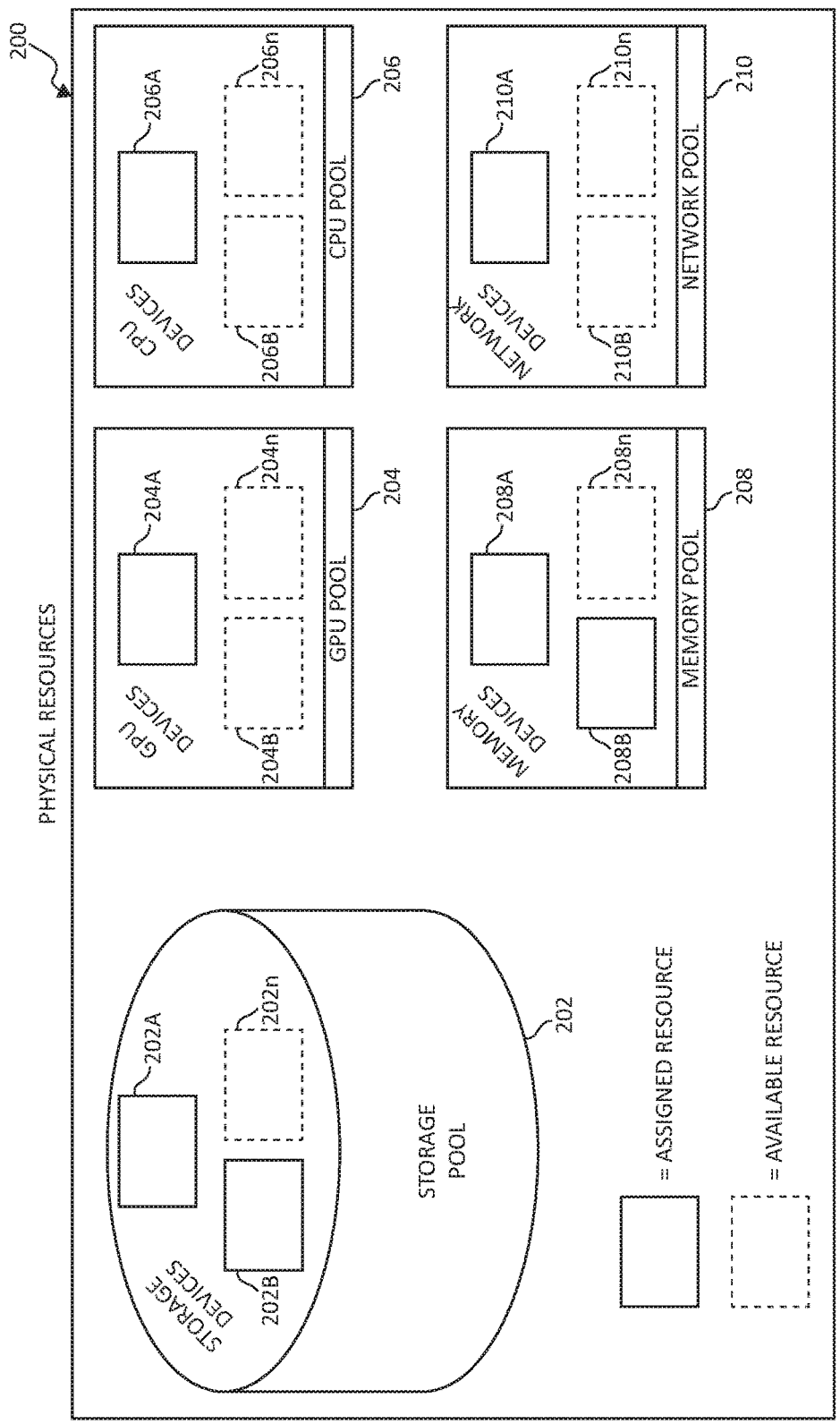
FIG. 3B is still an additional block diagram showing a hardware structure of a disaggregated computing environment, in which aspects of the present invention may be realized.

Continuing to FIG. 3B, a block diagram illustrating the physical hardware resources 200 portion of FIG. 2 is illustrated. FIG. 3B is substantially similar to FIG. 3A while using an example of one or more tenants 212A-n requiring on-demand access to a storage or memory intensive workload. As depicted, storage device 202B and memory device 208B, which were previously available hardware resources referenced in FIG. 3A, may be assigned and allocated on-demand to the one or more respective tenants 212A-n to handle such workload. This allocation of hardware resources requires no system shutdown nor closing any running applications. As discussed, the allocation of storage device 202B and memory device 208B to the one or more respective tenants 212A-n may be triggered by a change in tenant 212A-n workload, tenant 212A-n SLA requirements, cost or performance optimization needs, or any predicted or anticipated change to the aforementioned.

Figure 4:
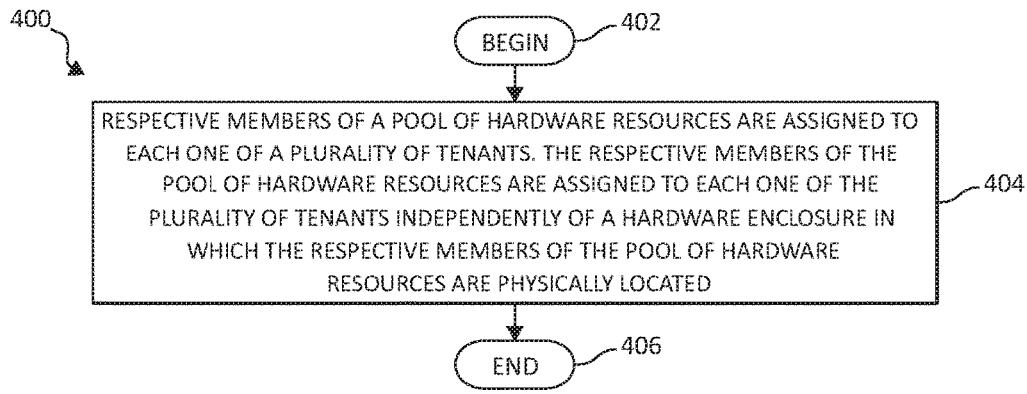
FIG. 4 is a flow chart diagram illustrating a method for allocating resources in a disaggregated cloud computing environment in accordance with various aspects of the present invention.

FIG. 4 illustrates a method 400 for allocating resources in a disaggregated cloud computing environment, in accordance with one embodiment of the present invention. The method 400 may be performed in accordance with the present invention in any of the environments depicted in FIGS. 2, 3A, and 3B, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 402), respective members of a pool of hardware resources are assigned to each one of a plurality of tenants based upon a classification of the respective members of the pool of hardware resources. The respective members of the pool of hardware resources are assigned to each one of the plurality of tenants independently of a hardware enclosure in which the respective members of the pool of hardware resources are physically located. In other words, the individual hardware resources may be physically located in one enclosure, or multiple enclosures within the environment (step 404). The method ends (step 406).

Figure 5:
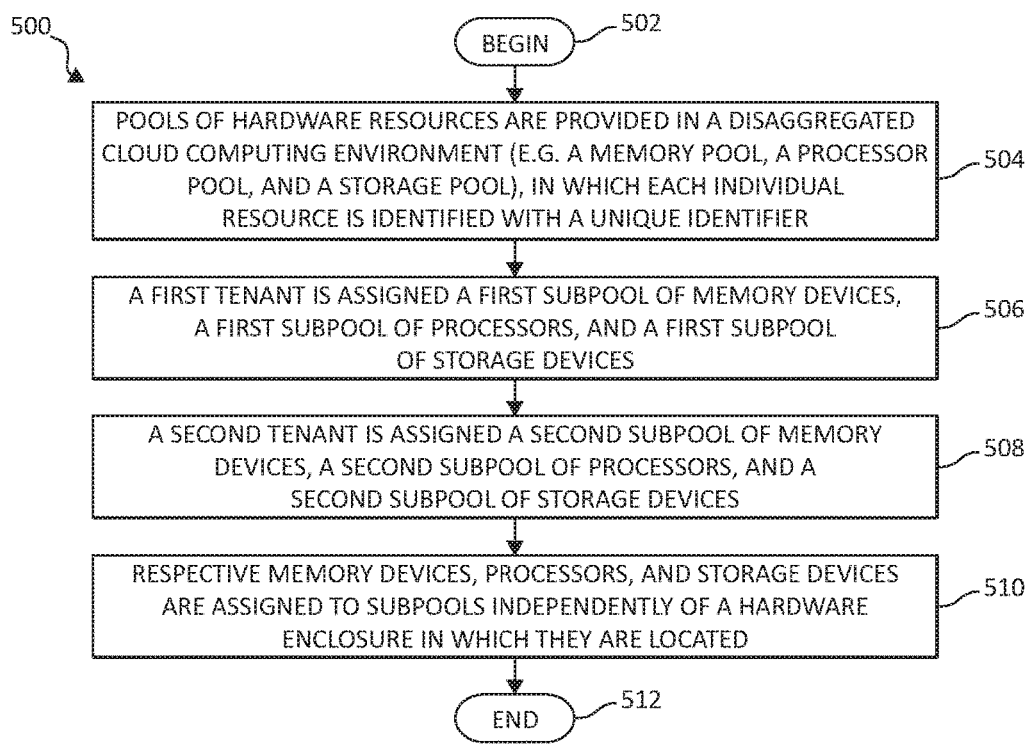
FIG. 5 is an additional flow chart diagram illustrating a method for allocating resources in a disaggregated cloud computing environment in accordance with various aspects of the present invention.

FIG. 5 illustrates a method 500 for allocating resources in a disaggregated cloud computing environment, providing a specific example of the discussed functionality. The method 500 may be performed in accordance with the present invention in any of the environments depicted in FIGS. 2, 3A, and 3B, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 500 begins (step 502) by providing pools of hardware resources in a disaggregated cloud computing environment. In this example, memory pool 208, CPU pool 206, and storage pool 202 are used, although one skilled in the art would recognize that a host of other component classification combinations may be used. Each individual hardware resource is identified with a unique physical and/or virtual identifier (step 504).

A first tenant (e.g. tenant 212A) is assigned a first subpool of memory devices (e.g. memory devices 208A-n), a first subpool of processors (e.g. CPU devices 206A-n), and a first subpool of storage devices (e.g. storage devices 202A-n) (step 506).

A second tenant (e.g. tenant 212B) is assigned a second subpool of the memory devices (e.g. memory devices 208A-n), a second subpool of the processors (e.g. CPU devices 206A-n), and a second subpool of the storage devices (e.g. storage devices 202A-n) (step 508).

Each respective hardware resource is assigned to the first and second subpools independently of a hardware enclosure in which they are physically located (step 510). The method ends (step 512).

Figure 6:
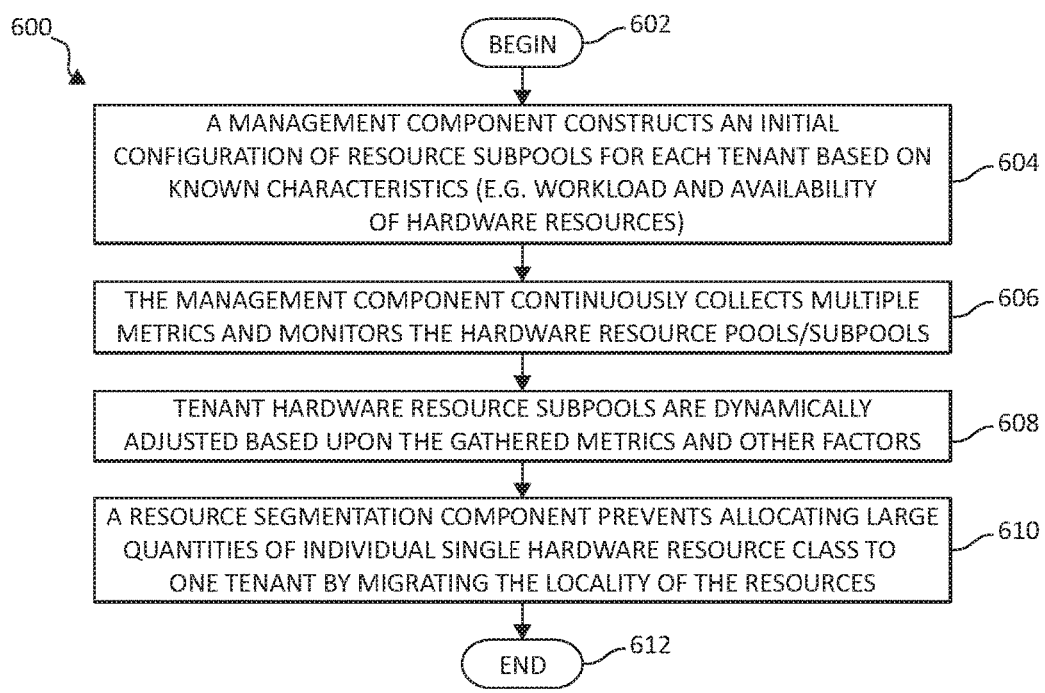
FIG. 6 is still an additional flow chart diagram illustrating a method for allocating resources in a disaggregated cloud computing environment in accordance with various aspects of the present invention.

Concluding, FIG. 6 illustrates a method 600 for allocating resources in a disaggregated cloud computing environment. The method 600 may be performed in accordance with the present invention in any of the environments depicted in FIGS. 2, 3A, and 3B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 600 begins (step 602) with a management component (i.e. management module 250) constructing an initial configuration of resource subpools or classifications for each respective tenant 212A-n based upon known characteristics. These characteristics may include tenant 212A-n workload information, predicted workload information, availability of individual hardware resources, tenant 212A-n SLA requirements, and/or cost and performance requirements (step 604).

The management component continuously collects multiple metrics and monitors the individual hardware resource classifications or pools/subpools. These metrics may include task progress rates, hardware resource utilization information, improved workload performance and/or cost reduction metrics (step 606).

Tenant 212A-n hardware resources classifications or subpools are dynamically adjusted in real-time based upon the gathered metrics and other factors (e.g. SLA requirements, workload requirements, etc.) (step 608).

A mapping is maintained by the management module 250 between each individual hardware resource and a respective assigned tenant 212A-n, and a resource segmentation technique provided by the management module 250 prevents allocating large quantities of individual hardware resource classes to one tenant by migrating a locality of the hardware resources. In one embodiment, this may entail physically migrating a workload to another hardware resource. In other embodiments, this may entail scaling or descaling the amount of hardware resource classifications assigned to an individual tenant 212A-n. Other variations, of course, are possible while staying within the scope of the present invention.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for allocating resources in a disaggregated cloud computing environment, by a processor device, comprising:
    assigning respective members of a pool of hardware resources to each one of a plurality of tenants based upon a classification of the respective members of the pool of hardware resources; wherein the respective members of the pool of hardware resources are assigned to each one of the plurality of tenants independently of a hardware enclosure in which the respective members of the pool of hardware resources are physically located; and
    performing a workload received from a respective one of the tenants by the respective members of the pool of hardware resources according to the classification.

2. The method of claim 1, wherein the classification of the respective members of the pool of hardware resources includes at least one of memory devices, processors, and storage devices.

3. The method of claim 1, wherein the respective members of the pool of hardware resources are available to be assigned to each one of the plurality of tenants in an arbitrary quantity within a limit of one of a total capacity and a quantum step sizing restriction of the classification of the respective members of the pool of hardware resources.

4. The method of claim 1, wherein the assigning is performed to each respective one of the plurality of tenants according to at least one of tenant requirements, Service Level Agreement (SLA) requirements, and tenant workload characteristics.

5. The method of claim 4, further including dynamically changing assignments of the respective members of the pool of hardware resources to each respective one of the plurality of tenants based upon changes to at least one of the tenant requirements, the SLA requirements, and the tenant workload characteristics; and
    dynamically changing assignments of the respective members of the pool of hardware resources to each respective one of the plurality of tenants based upon optimizing at least one of a workload cost and a workload performance.

6. The method of claim 5, further including dynamically changing assignments of the respective members of the pool of hardware resources to each respective one of the plurality of tenants based upon a predicted change to at least one of the tenant requirements, the SLA requirements, and the tenant workload characteristics.

7. The method of claim 1, further including constructing initial assignments of the respective members of the pool of hardware resources to each respective one of the plurality of tenants according to known tenant workload characteristics and an availability of the respective members of the pool of hardware resources.

8. The method of claim 1, further including managing a segmentation of each of the respective members of the pool of hardware resources between each respective one of the plurality of tenants; and
    initiating a migration process to optimize a locality of one or more of the respective members of the pool of hardware resources assigned to a respective one of the plurality of tenants.

9. The method of claim 1, further including maintaining a mapping between each of the respective members of the pool of hardware resources and a respective one of the plurality of tenants to which the respective member is assigned; wherein each of the respective members of the pool of hardware resources is identified with a unique identifier.

10. A system for allocating resources in a disaggregated cloud computing environment, the system comprising:
    at least one processor device, wherein the at least one processor device:
        assigns respective members of a pool of hardware resources to each one of a plurality of tenants based upon a classification of the respective members of the pool of hardware resources; wherein the respective members of the pool of hardware resources are assigned to each one of the plurality of tenants independently of a hardware enclosure in which the respective members of the pool of hardware resources are physically located; and
        performs a workload received from a respective one of the tenants by the respective members of the pool of hardware resources according to the classification.

11. The system of claim 10, wherein the classification of the respective members of the pool of hardware resources includes at least one of memory devices, processors, and storage devices.

12. The system of claim 10, wherein the respective members of the pool of hardware resources are available to be assigned to each one of the plurality of tenants in an arbitrary quantity within a limit of one of a total capacity and a quantum step sizing restriction of the classification of the respective members of the pool of hardware resources.

13. The system of claim 10, wherein the assigning is performed to each respective one of the plurality of tenants according to at least one of tenant requirements, Service Level Agreement (SLA) requirements, and tenant workload characteristics.

14. The system of claim 13, wherein the at least one processor device dynamically changes assignments of the respective members of the pool of hardware resources to each respective one of the plurality of tenants based upon changes to at least one of the tenant requirements, the SLA requirements, and the tenant workload characteristics, and dynamically changes assignments of the respective members of the pool of hardware resources to each respective one of the plurality of tenants based upon optimizing at least one of a workload cost and a workload performance.

15. The system of claim 14, wherein the at least one processor device dynamically changes assignments of the respective members of the pool of hardware resources to each respective one of the plurality of tenants based upon a predicted change to at least one of the tenant requirements, the SLA requirements, and the tenant workload characteristics.

16. The system of claim 10, wherein the at least one processor device constructs initial assignments of the respective members of the pool of hardware resources to each respective one of the plurality of tenants according to known tenant workload characteristics and an availability of the respective members of the pool of hardware resources.

17. The system of claim 10, wherein the at least one processor device manages a segmentation of each of the respective members of the pool of hardware resources between each respective one of the plurality of tenants; and initiates a migration process to optimize a locality of one or more of the respective members of the pool of hardware resources assigned to a respective one of the plurality of tenants.

18. The system of claim 10, wherein the at least one processor device maintains a mapping between each of the respective members of the pool of hardware resources and a respective one of the plurality of tenants to which the respective member is assigned; wherein each of the respective members of the pool of hardware resources is identified with a unique identifier.

19. A computer program product for allocating resources in a disaggregated cloud computing environment, by a processor device, the computer program product embodied on a non-transitory computer-readable storage medium having computer-readable program code portions stored therein, the computer-readable program code portions comprising:

an executable portion that assigns respective members of a pool of hardware resources to each one of a plurality of tenants based upon a classification of the respective members of the pool of hardware resources; wherein the respective members of the pool of hardware resources are assigned to each one of the plurality of tenants independently of a hardware enclosure in which the respective members of the pool of hardware resources are physically located; and an executable portion that performs a workload received from a respective one of the tenants by the respective members of the pool of hardware resources according to the classification.

20. The computer program product of claim 19, wherein the classification of the respective members of the pool of hardware resources includes at least one of memory devices, processors, and storage devices.

21. The computer program product of claim 19, wherein the respective members of the pool of hardware resources are available to be assigned to each one of the plurality of tenants in an arbitrary quantity within a limit of one of a total capacity and a quantum step sizing restriction of the classification of the respective members of the pool of hardware resources.

22. The computer program product of claim 19, wherein the assigning is performed to each respective one of the plurality of tenants according to at least one of tenant requirements, Service Level Agreement (SLA) requirements, and tenant workload characteristics.

23. The computer program product of claim 22, further including an executable portion that dynamically changes assignments of the respective members of the pool of hardware resources to each respective one of the plurality of tenants based upon changes to at least one of the tenant requirements, the SLA requirements, and the tenant workload characteristics; and dynamically changes assignments of the respective members of the pool of hardware resources to each respective one of the plurality of tenants based upon optimizing at least one of a workload cost and a workload performance.

24. The computer program product of claim 23, further including an executable portion that dynamically changes assignments of the respective members of the pool of hardware resources to each respective one of the plurality of tenants based upon a predicted change to at least one of the tenant requirements, the SLA requirements, and the tenant workload characteristics.

25. The computer program product of claim 19, further including an executable portion that constructs initial assignments of the respective members of the pool of hardware resources to each respective one of the plurality of tenants according to known tenant workload characteristics and an availability of the respective members of the pool of hardware resources.

26. The computer program product of claim 19, further including an executable portion that manages a segmentation of each of the respective members of the pool of hardware resources between each respective one of the plurality of tenants; and an executable portion that initiates a migration process to optimize a locality of one or more of the respective members of the pool of hardware resources assigned to a respective one of the plurality of tenants.

27. The computer program product of claim 19, further including an executable portion that maintains a mapping between each of the respective members of the pool of hardware resources and a respective one of the plurality of tenants to which the respective member is assigned; wherein each of the respective members of the pool of hardware resources is identified with a unique identifier.

* * * * *